United States Patent
Kim

(10) Patent No.: US 8,475,038 B2
(45) Date of Patent: Jul. 2, 2013

(54) TEMPERATURE SENSOR AND METHOD OF COMPENSATING FOR CHANGE IN OUTPUT CHARACTERISTIC DUE TO VARYING TEMPERATURE

(75) Inventor: Hyung-seuk Kim, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 638 days.

(21) Appl. No.: 12/591,631

(22) Filed: Nov. 25, 2009

(65) Prior Publication Data

US 2010/0141329 A1    Jun. 10, 2010

(30) Foreign Application Priority Data

Dec. 9, 2008 (KR) .................. 10-2008-0124744

(51) Int. Cl.
*G01K 7/00* (2006.01)

(52) U.S. Cl.
USPC ........... 374/170; 374/172; 374/173; 374/169; 327/513

(58) Field of Classification Search
USPC .................. 374/170, 172, 173, 169; 327/512
See application file for complete search history.

(56) References Cited

U.S. PATENT DOCUMENTS

| 4,210,024 A * | 7/1980 | Ishiwatari et al. ............ 374/183 |
| 6,052,035 A | 4/2000 | Nolan et al. |
| 6,356,161 B1 | 3/2002 | Nolan et al. |
| 6,891,358 B2 | 5/2005 | Marinca et al. |
| 2003/0156622 A1* | 8/2003 | Gold et al. .................... 374/170 |
| 2005/0185491 A1* | 8/2005 | Kim et al. .................... 365/222 |
| 2006/0190210 A1* | 8/2006 | Mukherjee .................... 702/130 |
| 2009/0129438 A1* | 5/2009 | Pan ................................ 374/170 |
| 2010/0002748 A1* | 1/2010 | Lin et al. ....................... 374/170 |

FOREIGN PATENT DOCUMENTS

KR  10 2007 0087516   8/2007

* cited by examiner

*Primary Examiner* — Mirellys Jagan
(74) *Attorney, Agent, or Firm* — Harness, Dickey & Pierce, P.L.C.

(57) ABSTRACT

Described is a method and apparatus for compensating for a change in an output characteristic of a temperature sensor due to varying temperature. The temperature sensor includes a temperature sensing core, an analog-to-digital converter, a counter, and a temperature compensating circuit. The temperature sensing core generates a sense voltage corresponding to a sensed temperature. The analog-to-digital converter converts the sense voltage into a digital signal and generates a conversion signal. The temperature compensating circuit generates a counter clock signal that varies according to a temperature change. The counter counts the number of pulses of the counter clock signal according to the conversion signal.

19 Claims, 7 Drawing Sheets

|  | SAR TS | PROPOSED TS |
|---|---|---|
| ACCURACY (error) | ~23°C | ~2°C |
| AREA | ~187000 um² | ~94000 um² |
| RESOLUTION | 1°C/bit | 2.5°C/bit |

TEMPERATURE SENSOR AND METHOD OF COMPENSATING FOR CHANGE IN OUTPUT CHARACTERISTIC DUE TO VARYING TEMPERATURE

CROSS-REFERENCE TO RELATED APPLICATIONS

This application claims priority under 35 U.S.C. §119 to Korean Patent Application No. 10-2008-0124744, filed on Dec. 9, 2008, in the Korean Intellectual Property Office (KIPO), the entire contents of which is incorporated herein by reference.

BACKGROUND

Example embodiments relate to a temperature sensor, and more particularly, to a temperature sensor to compensate for a change in an output characteristic due to varying temperature.

Even if other conditions are unchanged, the amount of current flowing through a transistor, which is a semiconductor device, varies according to an ambient temperature around the transistor since electron mobility varies with temperature. In general, since electron mobility decreases as temperature increases, if temperature increases, the amount of current flowing through the transistor decreases.

Temperature sensors, based on the principle that the amount of current varies according to the temperature of a transistor, may detect a change in the amount of current flowing through a bipolar transistor due to varying temperature by using a current mirror. The temperature sensors convert the detected change in the amount of current into a corresponding voltage that is an analog voltage, convert the corresponding voltage into a digital signal by using an analog-to-digital converter, and display a temperature corresponding to the digital signal by using a counter.

Such a temperature sensor includes a bipolar transistor, a current mirror, an analog-to-digital converter, and a counter, all of which include transistors. Accordingly, as an ambient temperature around the temperature sensor increases, not only does the amount of current flowing through the bipolar transistor change, but also the amount of current flowing through the current mirror, the analog-to-digital converter, and the counter change.

Ideally, a temperature displayed by the counter varies linearly as temperature increases linearly. However, due to the aforementioned temperature characteristics of the bipolar transistor, the current mirror, the analog-to-digital converter, and the counter, there is always a difference between the displayed temperature and the actual temperature.

SUMMARY

Example embodiments provide a temperature compensator to compensate for a change in an output characteristic due to varying temperature.

Example embodiments provide a method of compensating for a change in an output characteristic due to varying temperature by using the temperature sensor.

According to an example embodiment, provided is a temperature sensor including a temperature sensing core configured to generate a sense voltage corresponding to a sensed temperature. An analog-to-digital converter configured to convert the sense voltage into a digital signal and generate a conversion signal. A temperature compensating circuit configured to generate a counter clock signal that varies according to a change in temperature, and a counter configured to generate an output temperature by counting a number of pulses of the counter clock signal according to the conversion signal.

According to an example embodiment, provided is a method of compensating for a change in an output characteristic due to varying temperature by using a temperature sensor that includes generating, by a temperature sensing core, a sense voltage corresponding to a sensed temperature. Converting, by an analog-to-digital converter, the sense voltage into a digital signal and generating, by the analog-to-digital converter a conversion signal. Generating, by a temperature compensating circuit, a counter clock signal, and counting, by a counter, counting the number of pulses of the counter clock signal according to the conversion signal. The frequency of the counter clock signal varies according to a temperature sensed by the temperature sensor.

BRIEF DESCRIPTION OF THE DRAWINGS

Example embodiments will be more clearly understood from the following brief description taken in conjunction with the accompanying drawings.

FIG. 1 illustrates a series of graphs for explaining a temperature sensor according to an example embodiment.

FIG. 2 is a block diagram of a temperature sensor according to an example embodiment.

FIG. 3 is a circuit diagram of an analog-to-digital converter of the temperature sensor of FIG. 2, according to an example embodiment.

FIG. 4 is a graph illustrating a relationship between a time and an output voltage of an operational amplifier of the analog-to-digital converter of FIG. 3.

FIG. 5 is a circuit diagram of a first compensating unit of a temperature compensating circuit of the temperature sensor of FIG. 2, according to an example embodiment.

FIG. 6 is a circuit diagram of a second compensating unit of the temperature compensating circuit of the temperature sensor of FIG. 2, according to an example embodiment.

FIG. 7 is a circuit diagram of an oscillator of the temperature sensor of FIG. 2, according to an example embodiment.

FIG. 8 is a circuit diagram of an inverter of the oscillator of FIG. 7, according to an example embodiment.

FIG. 9 is a circuit diagram of an inverter of the oscillator of FIG. 7, according to an example embodiment.

FIG. 10 is a circuit diagram of an inverter of the oscillator of FIG. 7, according to an example embodiment.

FIG. 11 is a graph illustrating results of an experiment, that is a relationship between an ambient temperature around a conventional temperature sensor and an output characteristic of the conventional temperature sensor.

FIG. 12 is a graph illustrating results of another experiment, that is a relationship between an ambient temperature around a temperature sensor according example embodiments and an output characteristic of the temperature sensor.

FIG. 13 is a table showing conditions and the results of the experiments of FIGS. 11 and 12.

Figure 1:
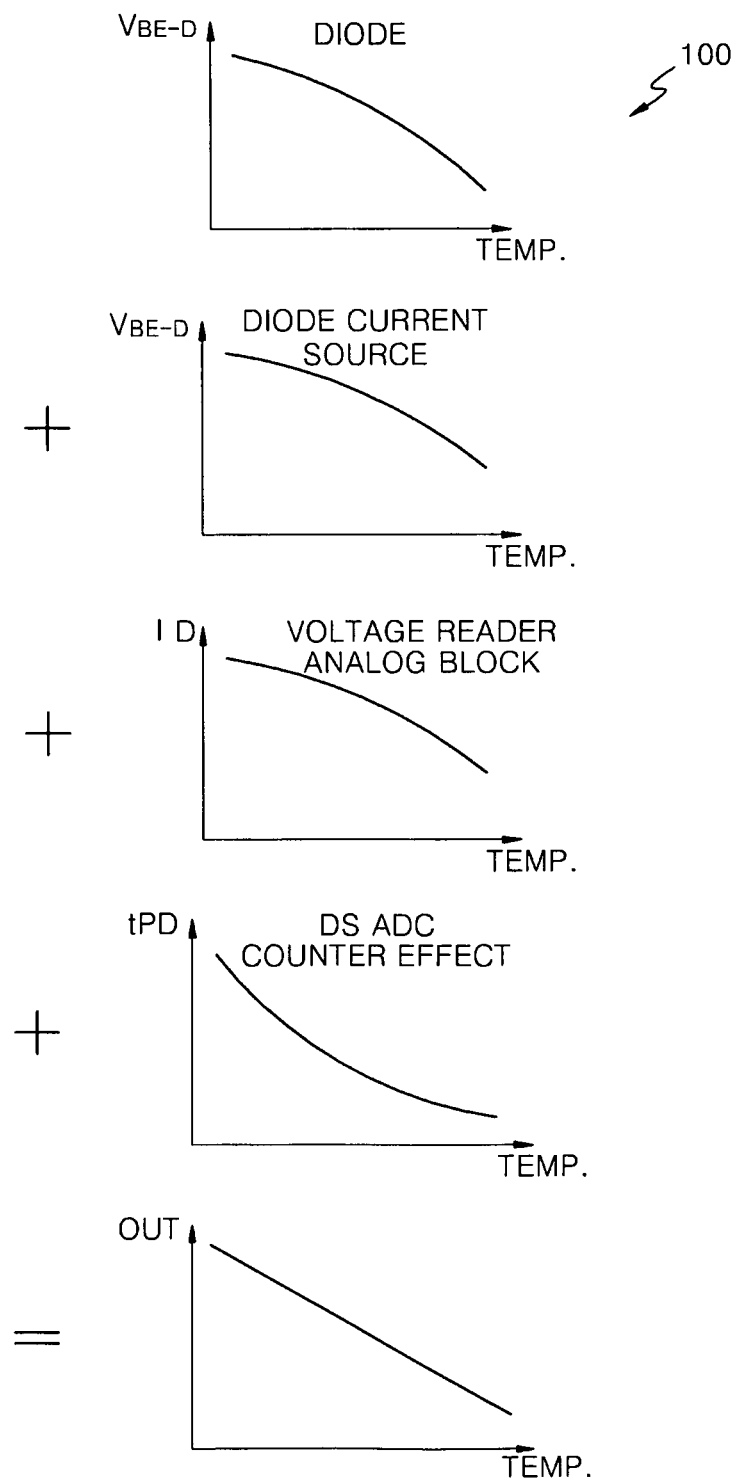
FIGS. 1-13 represent non-limiting, example embodiments as described herein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 illustrates a series of graphs for explaining a temperature sensor according to an example embodiment.

Referring to FIG. 1, the temperature sensor may have linear temperature characteristics by combining a diode, a diode current source, a corresponding voltage converter, which may have the same temperature characteristic, and a counter, which may have a temperature characteristic that is different from the temperature characteristic of each of the diode, the diode current source, and the corresponding voltage converter.

Each of the respective relationships between an output voltage VBE_D of the diode, an output voltage VBE_D of the diode current source, and an output current ID of the corresponding voltage converter (voltage reader current block) with temperature may be expressed as a convex-shaped curve. Accordingly, if the relationship between a temperature characteristic tPD of the counter and temperature is expressed as a concave-shaped curve, the convex shape and the concave shape may be offset, thereby obtaining a linear shape as shown in the lowermost graph of FIG. 1.

Figure 2:
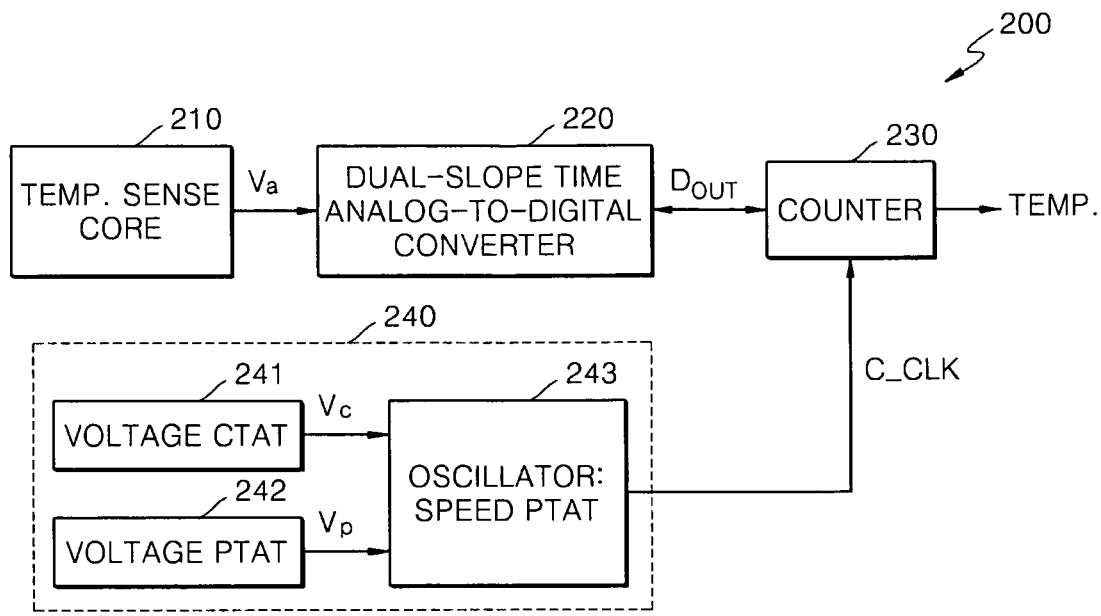

FIG. 2 is a block diagram of a temperature sensor 200 according to an example embodiment.

Referring to FIG. 2, the temperature sensor 200 according to the example embodiment may include a temperature sensing core 210, an analog-to-digital converter 220, a counter 230, and a temperature compensating circuit 240.

The temperature sensing core 210 may generate a sense voltage Va corresponding to a sensed temperature. The analog-to-digital converter 220 may convert the sense voltage $V_a$ into a digital signal and may generate a conversion signal $D_{OUT}$. The temperature compensating circuit 240 may generate a counter clock signal C_CLK that varies according to a change in temperature. The counter 230 may count the number of pulses of the counter clock signal C_CLK according to the conversion signal $D_{OUT}$.

The temperature compensating circuit 240 may include a first compensating unit 241, a second compensating unit 242, and an oscillator 243. The first compensating unit 241 generates a first control voltage $V_c$ that may be inversely proportional to the change in temperature. The second compensating unit 242 generates a second control voltage $V_p$ that may be proportional to the change in temperature. The oscillator 243 may generate the counter clock signal C_CLK in response to the first control voltage Vc and the second control voltage $V_p$.

As described above with reference to FIG. 1, the relationship between the conversion signal $D_{OUT}$ and temperature may be expressed as a convex-shaped curve. If the conversion signal $D_{OUT}$ is counted as it is, a temperature lower than the actual temperature may be displayed. Accordingly, the temperature sensor 200 according to the example embodiment may compensate for such a difference between the displayed temperature and the actual temperature by adjusting the frequency of the counter clock signal C_CLK that may determine the operating speed of the counter 230.

The operation of the temperature sensor 200 of FIG. 2 will be explained below.

Figure 3:
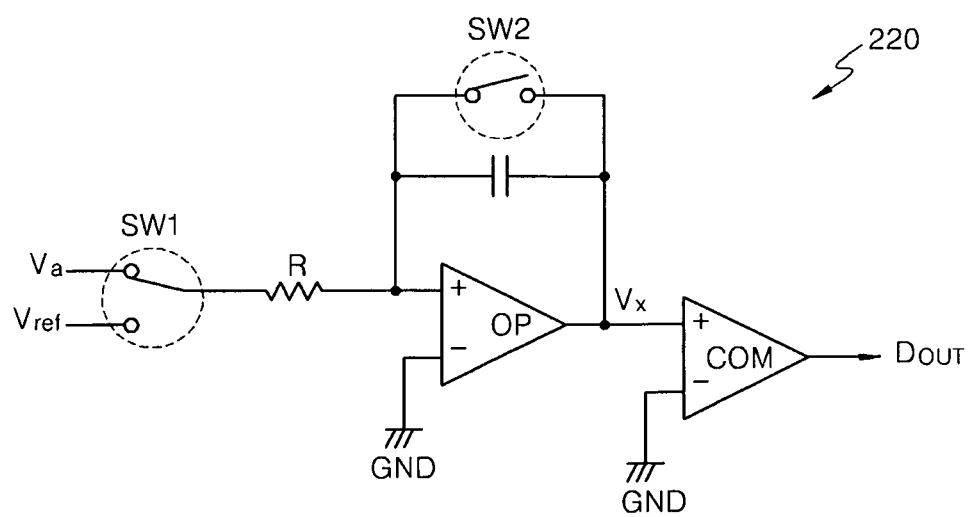

FIG. 3 is a circuit diagram of the analog-to-digital converter 220 of the temperature sensor 200 of FIG. 2, according to an example embodiment.

Referring to FIG. 3, the analog-to-digital converter 220 of the example embodiment may include a resistor R, a capacitor C, first and second switches SW1 and SW2, an operational amplifier OP, and a comparator COM. The resistor, the capacitor, the first and second switches SW1 and SW2, and the operational amplifier OP may generate a charge voltage $V_x$ corresponding to a received sense voltage $V_a$. The comparator COM may compare the charge voltage $V_x$ with a ground voltage GND and outputs a logic value as the conversion signal $D_{OUT}$. The analog-to-digital converter 220 of the temperature sensor 200 of FIG. 2 may be a dual-slope time analog-to-digital converter.

Figure 4:
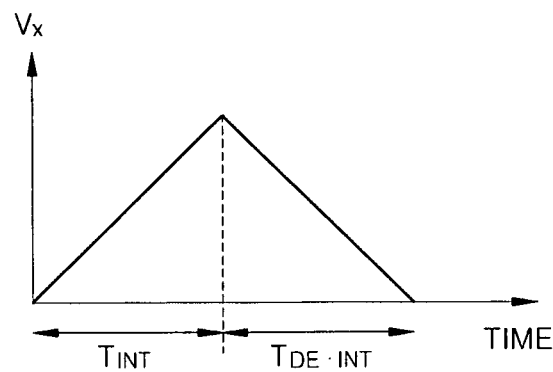

FIG. 4 is a graph illustrating a relationship between time and charge voltage $V_x$ of the operational amplifier OP of the analog-to-digital converter 220 of FIG. 3.

Referring to FIGS. 3 and 4, in an interval $T_{INT}$ in which the first switch SW1 selects the sense voltage $V_a$ and the second switch SW2 is closed, the output voltage $V_x$ of the operational amplifier OP may increase. In an interval $T_{DE-INT}$ in which the first switch SW1 selects a reference voltage $V_{ref}$ and the second switch SW2 is opened, the output voltage $V_x$ of the operational amplifier OP may decrease. For example, charges accumulated in an output terminal of the operational amplifier OP may be discharged toward the reference voltage $V_{ref}$.

Referring to FIG. 4, a slope extends upward in the interval $T_{INT}$ and extends downward in the interval $T_{DE-INT}$. The counter 230 counts the length of the interval $T_{DE-INT}$ in which the slope extends downward and may output the counted length as a temperature.

The operation of the analog-to-digital converter 220 of FIG. 3 is well known, and thus a detailed explanation thereof will not be given.

Figure 5:
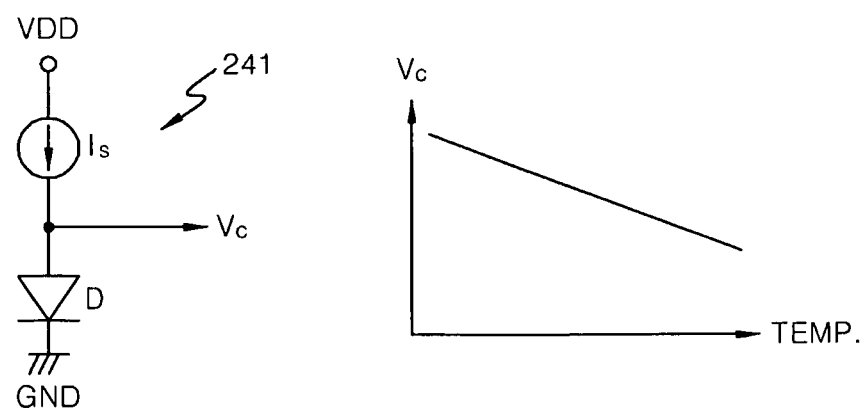

FIG. 5 is a circuit diagram of the first compensating unit 241 of the temperature compensating circuit 240 of the temperature sensor 200 of FIG. 2, according to an example embodiment.

Referring to FIG. 5, the first compensating unit 241 according to the example embodiment may include a current source supplying a current $I_s$ and a diode operating by receiving the current Is from the current source. The first control voltage $V_c$, corresponding to a potential difference between the anode of the diode and a ground voltage source GND is inversely proportional to a temperature rise as shown in the corresponding graph.

Figure 6:
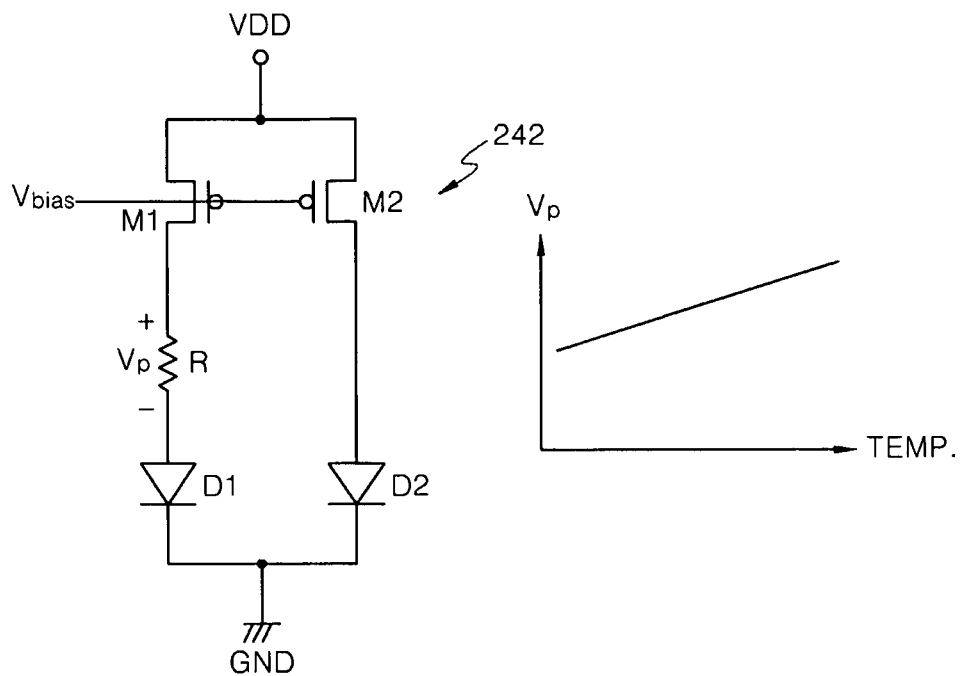

FIG. 6 is a circuit diagram of the second compensating unit 242 of the temperature compensating circuit 240 of the temperature sensor of FIG. 2, according to an example embodiment.

Referring to FIG. 6, the second compensating unit 242 according to the example embodiment may include first and second MOS transistors M1 and M2 configured as a current mirror, a resistor R serially connected between one terminal of the first MOS transistor M1 and the anode of a first diode D1. The N terminal of the first diode D1 is connected to a ground voltage source GND. A second diode D2 is connected between one terminal of the second MOS transistor M2 and the ground voltage source GND.

The first diode D1 may have an area that is N times greater than the area of the second diode D2. A second control voltage $V_p$, which is dropped across the resistor R, is proportional to a temperature rise as shown in the corresponding graph.

Referring to FIGS. 5 and 6, the frequency of the counter clock signal C_CLK output from the oscillator 243 may be adjusted by using the second control voltage $V_p$, which may be proportional to the temperature rise, and the first control voltage $V_c$, which may be inversely proportional to the temperature rise.

Figure 7:
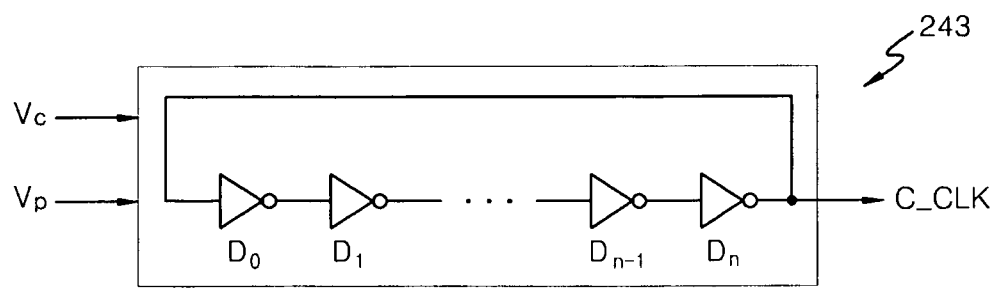

FIG. 7 is a circuit diagram of the oscillator 243 of the temperature sensor 200 of FIG. 2, according to an example embodiment.

Referring to FIG. 7, the oscillator 243 according to the example embodiment may include inverters $D_0$-$D_n$ serially connected to one another to form a closed loop. Although not illustrated in FIG. 7, at least one of the inverters may have a response delay that varies according to at least one of the first control voltage $V_c$ and the second control voltage $V_p$. The term 'response delay' refers to a period of time between a point of time when an input signal is applied to an inverter and a point of time when an output signal is output from the inverter.

The frequency of the counter clock signal C_CLK output from the oscillator 243 may vary according to a change in the response delay of an inverter. More specifically, the frequency of the counter clock signal C_CLK may be inversely proportional to the response delay of the inverter. For example, the frequency of the counter clock signal C_CLK may decrease as the response delay of the inverter increases, and may increase as the response delay of the inverter decreases.

Figure 8:
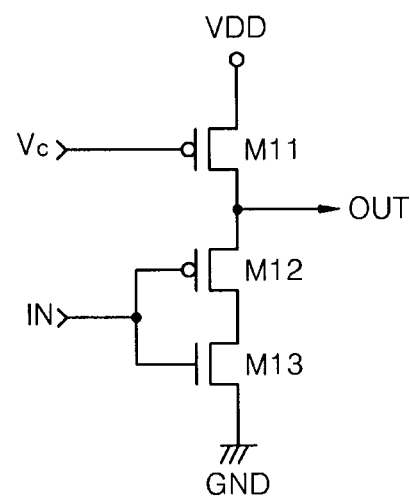

FIG. 8 is a circuit diagram of an inverter (referred to as a first-type inverter) of the oscillator 243 of FIG. 7, according to an example embodiment.

Referring to FIG. 8, the first-type inverter according to the example embodiment may include a first MOS transistor M11 having one terminal connected to a power voltage source VDD, the other terminal connected to an output node OUT, and a gate to which a first control voltage $V_c$ is applied. The first-type inverter may further include, a second MOS transistor M12 having one terminal connected to the output node OUT and a gate connected to an input node IN. In addition, third MOS transistor M13 having one terminal connected to the other terminal of the second MOS transistor M12, the other terminal connected to a ground voltage source GND, and a gate connected to the input node IN.

The first control voltage $V_c$ may be applied to the gate of the first MOS transistor M11. Since the first control voltage $V_c$ may decrease as temperature increases and the first MOS transistor M11 may be a P MOS transistor, if temperature increases, the amount of current flowing through the first MOS transistor M11 may increase, thereby reducing the response delay of the output node OUT. For example, if the oscillator 243 uses the first-type inverter and temperature increases, the frequency of the counter clock signal C_CKT may increase.

Figure 9:
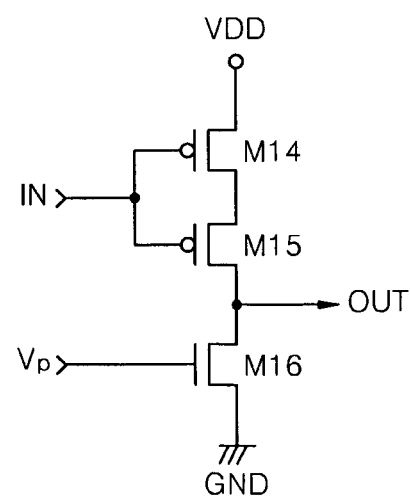

FIG. 9 is a circuit diagram of an inverter (referred to as a second-type inverter) of the oscillator 243 of FIG. 7, according to another example embodiment.

Referring to FIG. 9, the second-type inverter according to the example embodiment may include a fourth MOS transistor M14 having one terminal connected to a power voltage source VDD and a gate connected to an input node IN. The second-type inverter may further include a fifth MOS transistor M15 having one terminal connected to the other terminal of the fourth MOS transistor M14, the other terminal connected to an output node OUT, and a gate connected to the input node IN. In addition, a sixth MOS transistor M16 having one terminal connected to the output node OUT, the other terminal connected to a ground voltage source GND, and a gate to which a second control voltage $V_p$ is applied.

The second control voltage $V_p$ may be applied to the gate of the sixth MOS transistor M16. Since the second control voltage $V_p$ may increase as temperature increases and the sixth MOS transistor M16 is an N MOS transistor, if temperature increases, the amount of current sinking in the sixth MOS transistor M16 may increase, thereby reducing the response delay of the output node OUT. For example, if the oscillator 243 uses the second-type inverter and temperature increases, the frequency of the counter clock signal C_CLK may increase.

Figure 10:
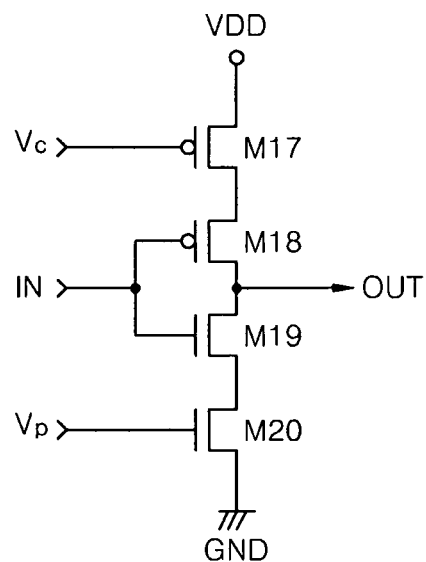

FIG. 10 is a circuit diagram of an inverter (referred to as a third-type inverter) of the oscillator 243 of FIG. 7, according to an example embodiment.

Referring to FIG. 10, the third-type inverter according to the example embodiment may include: a seventh MOS transistor M17 having one terminal connected to a power voltage source VDD and a gate to which a first control voltage $V_c$ is applied. The third-type inverter may further include an eighth MOS transistor M18 having one terminal connected to the other terminal of the seventh MOS transistor M17, the other terminal connected to an output node OUT, and a gate connected to an input node IN. In addition, a ninth MOS transistor M19 having one terminal connected to the output node OUT and a gate connected to the input node IN. Further, a tenth MOS transistor M20 having one terminal connected to the other terminal of the ninth MOS transistor M19, the other terminal connected to a ground voltage source GND, and a gate to which a second control voltage $V_p$ is applied.

The first control voltage $V_c$ may be applied to the gate of the seventh MOS transistor M17 that is a P MOS transistor, the second voltage $V_p$ may be applied to the gate of the tenth MOS transistor M20 that is an N MOS transistor, and the eighth and ninth transistors M18 and M19 configured as an inverter may be between the seventh MOS transistor M17 and the tenth MOS transistor M20. Compared with the first-type inverter and the second-type inverter respectively illustrated in FIGS. 8 and 9, the third-type inverter illustrated in FIG. 10 may reduce a response delay more effectively than the first-type inverter and the second-type inverter.

Figure 11:
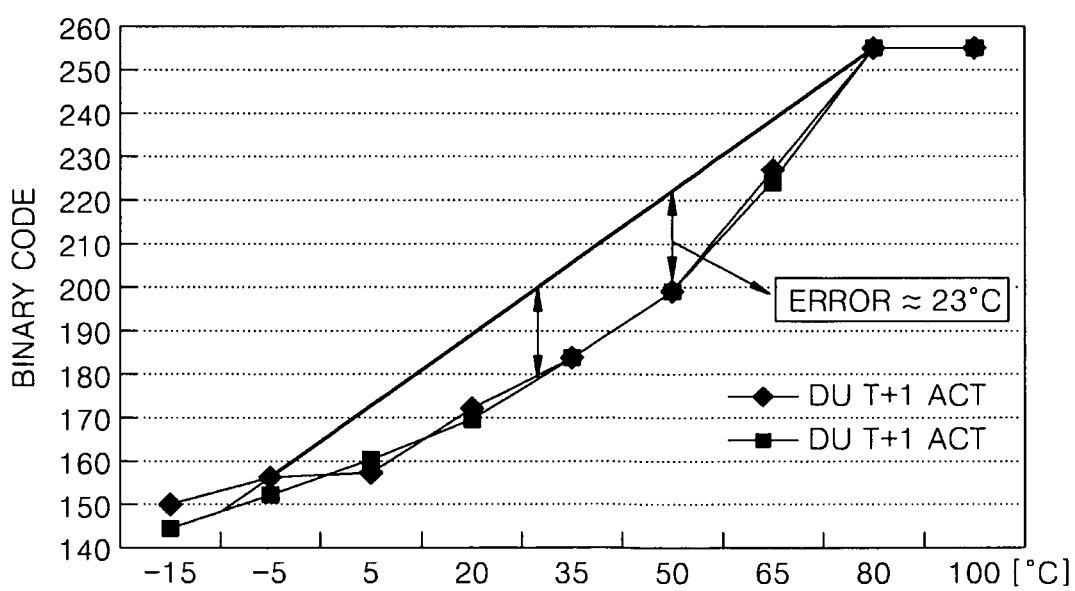

FIG. 11 is a graph illustrating results of an experiment showing a relationship between an ambient temperature around a conventional temperature sensor and an output characteristic of the conventional temperature sensor.

Figures 12, 13:
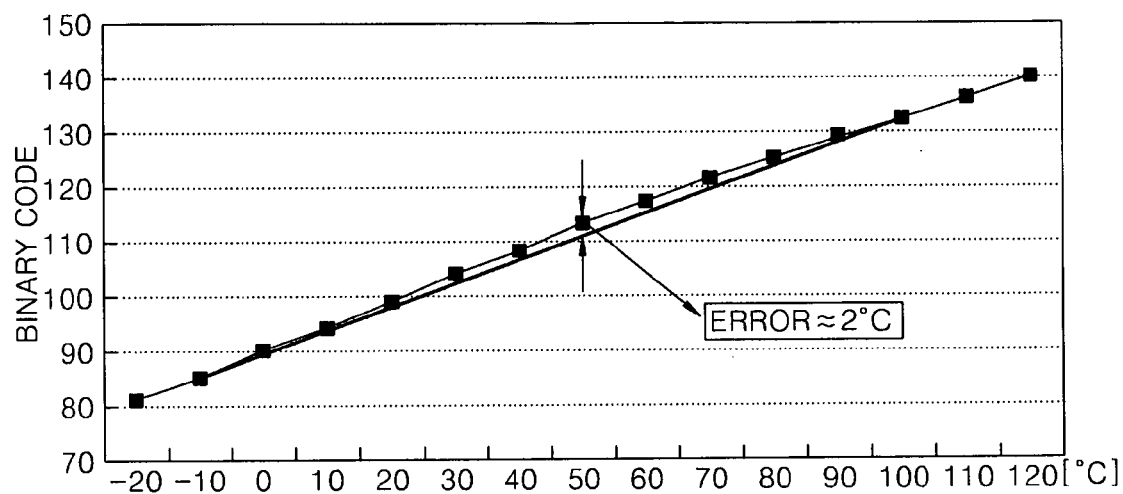

FIG. 12 is a graph illustrating results of another experiment showing a relationship between an ambient temperature around a temperature sensor according to the inventive concept and an output characteristic of the temperature sensor.

The conventional temperature sensor of FIG. 11 includes a successive approximation analog-to-digital converter, and the temperature sensor of FIG. 12 includes a dual-slope time analog-to-digital converter. A straight line shown in each of the graphs of FIGS. 11 and 12 indicates a desired characteristic to be output by each temperature sensor.

Referring to FIG. 11, there is a maximum difference of 23° C. between the desired characteristic and the output characteristic of the conventional temperature sensor when an arbitrary digital code is generated. Referring to FIG. 12, there is a maximum difference of 2° C. between the desired characteristic and the output characteristic of the temperature sensor according to the inventive concept when an arbitrary digital code is generated.

FIG. 13 is a table showing conditions and the results of the experiments described with reference to FIGS. 11 and 12.

Referring to FIGS. 11 through 13, the conventional temperature sensor of FIG. 11 has a resolution of 1° C. per bit, whereas the temperature sensor of FIG. 12 according to the inventive concept has a resolution of 2.5° C. per bit. The conventional temperature sensor of FIG. 11 has a total area of 187000 μm2, whereas the temperature sensor of FIG. 12 according to the inventive concept has a total area of 94000 μm2. Accordingly, the temperature sensor of FIG. 12 according to example embodiments occupies a smaller area and provides an improved temperature characteristic than the conventional sensor of FIG. 11.

As described above, the temperature sensor according to example embodiments may compensate for a change in an electrical characteristic due to the varying temperature of basic elements configured as the temperature sensor by using a temperature compensating circuit that generates a counter clock signal the frequency of which varies according to a change in temperature.

Although the temperature sensor has been described in detail, a method of compensating for a change in an electrical characteristic due to varying temperature can be easily derived from the description of the temperature sensor within the scope of the inventive concept.

While example embodiments have been particularly shown and described with reference to exemplary embodiments thereof, it will be understood by one of ordinary skill in the art that various changes in form and details may be made therein without departing from the spirit and scope of the following claims.

What is claimed is:

1. A temperature sensor comprising:
   a temperature sensing core configured to generate a sense voltage corresponding to a sensed temperature;
   an analog-to-digital converter configured to generate a conversion signal based on the sense voltage;
   a temperature compensating circuit configured to generate a counter clock signal based on changes in temperature; and
   a counter configured to generate an output temperature by counting a number of pulses of the counter clock signal according to the conversion signal.

2. The temperature sensor of claim 1, wherein the frequency of the counter clock signal increases as the sensed temperature increases and decreases as the sensed temperature decreases.

3. The temperature sensor of claim 1, wherein
   the input signal is at least one of inversely proportional and proportional to the changes in temperature, and
   changes in the input signal varies a frequency of the counter clock signal.

4. The temperature sensor of claim 1, wherein the counter outputs a linear output signal as the output temperature based on the sensed temperature, a temperature characteristic of the temperature sensing core, a temperature characteristic of the analog-to-digital converter and a temperature characteristic of the counter.

5. The temperature sensor of claim 4, wherein the analog-to-digital converter is configured to generate the conversion signal based on an accumulated charge corresponding to the sense voltage and a ground voltage.

6. The temperature sensor of claim 5, wherein the counter counts a length of time for the conversion signal to indicate discharge of the accumulated charge and outputs a counted length of time as the linear output signal.

7. The temperature sensor of claim 6, wherein the length of time for the conversion signal to indicate discharge of the accumulated charge corresponds to a length of time for the accumulated charge to discharge to a reference voltage.

8. The temperature sensor of claim 1, wherein the temperature compensating circuit comprises:
   a first compensating unit configured to generate a first control voltage that is inversely proportional to the changes in temperature;
   a second compensating unit configured to generate a second control voltage that is proportional to the changes in temperature; and
   an oscillator configured to generate the counter clock signal based on the first control voltage and the second control voltage.

9. The temperature sensor of claim 8, the first compensating unit comprising:
   a current source having a first terminal connected to a power voltage and a second terminal connected to an output node, the current source configured to supply a current; and
   a diode, having a third terminal connected to the output node and a fourth terminal connected to ground, wherein the first control voltage corresponds to a potential difference between the output node and a ground voltage.

10. The temperature sensor of claim 8, the second compensating unit comprising:
   a first transistor having a first terminal connected to a power voltage, a second terminal, and a first gate to which a bias voltage is applied;
   a second transistor having a third terminal connected to the power voltage, a fourth terminal, and a second gate connected to the first gate;
   a resistor having a fifth terminal connected to the second terminal and a sixth terminal;
   a first diode having a seventh terminal connected to the sixth terminal and an eighth terminal connected to a ground voltage; and
   a second diode having a ninth terminal connected to the fourth terminal, and a tenth terminal connected to the ground voltage, wherein
      the first transistor and the second transistor are configured as a current mirror, and
      the second control voltage corresponds to a voltage drop across the resistor.

11. The temperature sensor of claim 8, wherein the oscillator comprises a plurality of inverters serially connected to one another to form a loop, wherein at least one of the plurality of inverters has a response delay which varies in response to at least one of the first control voltage and the second control voltage.

12. The temperature sensor of claim 11, wherein the plurality of inverters comprise at least one of a group of inverters consisting of:
   a first-type inverter configured to operate in response to the first control voltage;
   a second-type inverter configured to operate in response to the second control voltage; and
   a third-type inverter configured to operate in response to the first control voltage and the second control voltage.

13. The temperature sensor of claim 12, wherein the first-type inverter comprises:
   a first transistor having a first terminal connected to a power voltage source, a second terminal connected to an output node, and a first gate to which the first control voltage is applied;
   a second transistor having a third terminal connected to the output node, a fourth terminal and a second gate connected to an input node; and
   a third transistor having a fifth terminal connected to the fourth terminal, a sixth terminal connected to a ground voltage source, and a third gate connected to the input node.

14. The temperature sensor of claim 12, wherein the second-type inverter comprises:
   a first transistor having a first terminal connected to a power voltage source, a second terminal, and a first gate connected to an input node;
   a second transistor having a third terminal connected to the second terminal, a fourth terminal connected to an output node, and a second gate connected to the input node; and
   a third transistor having a fifth terminal connected to the output node, a sixth terminal connected to a ground voltage source, and a third gate to which the second control voltage is applied.

15. The temperature sensor of claim 12, wherein the third-type inverter comprises:
   a first transistor having a first terminal connected to a power voltage source, a second terminal, and a first gate to which the first control voltage is applied;
   an second transistor having a third terminal connected to the second terminal, a fourth terminal connected to an output node, and a second gate connected to an input node;
   a third transistor having a fifth terminal connected to the output node, a sixth terminal, and a third gate connected to the input node; and
   a fourth transistor having a seventh terminal connected to the sixth terminal, an eighth terminal connected to a ground voltage source, and a fourth gate to which the second control voltage is applied.

16. A method of compensating for a change in an output characteristic due to varying temperature by using a temperature sensor, the method comprising:
   generating, by a temperature sensing core associated with the temperature sensor, a sense voltage corresponding to a sensed temperature;
   generating, by an analog-to-digital converter, a conversion signal based on the sense voltage;
   generating, by a temperature compensating circuit, a counter clock signal having a frequency that varies based on changes in temperature; and
   counting, by a counter, the number of pulses of the counter clock signal according to the conversion signal.

17. The method of claim 16, comprising:
   accumulating a charge voltage by the analog-to-digital converter, the charge voltage corresponding to the sense voltage;
   discharging the charge voltage, by the analog-to-digital converter, to a reference voltage;
   counting, by the counter, the length of time for the charge voltage to discharge; and outputting a linear signal corresponding to the length of time, as a temperature output of the temperature sensor.

18. The method of claim 16, wherein when the temperature sensed by the temperature sensor increases, the frequency of the counter clock signal increases.

19. The method of claim 16, wherein when the temperature sensed by the temperature sensor decreases, the frequency of the counter clock signal decreases.

* * * * *